United States Patent
Liu et al.

(10) Patent No.: US 11,601,233 B2
(45) Date of Patent: Mar. 7, 2023

(54) METHOD AND DEVICE IN UE AND BASE STATION USED FOR WIRELESS COMMUNICATION

(71) Applicant: SISVEL INTERNATIONAL SA, Luxembourg (LU)

(72) Inventors: Zheng Liu, Shanghai (CN); Xiaobo Zhang, Shanghai (CN)

(73) Assignee: SISVEL INTERNATIONAL SA, Luxembourg (LU)

( * ) Notice: Subject to any disclaimer, the term of this patent is extended or adjusted under 35 U.S.C. 154(b) by 0 days.

(21) Appl. No.: 17/464,690

(22) Filed: Sep. 2, 2021

(65) Prior Publication Data

US 2021/0399856 A1   Dec. 23, 2021

Related U.S. Application Data

(63) Continuation of application No. 16/858,638, filed on Apr. 26, 2020, now Pat. No. 11,153,140, which is a
(Continued)

(30) Foreign Application Priority Data

Nov. 6, 2017   (CN) .......................... 201711079561.5

(51) Int. Cl.
*H04L 5/00* (2006.01)
*H04L 27/26* (2006.01)
(Continued)

(52) U.S. Cl.
CPC .......... *H04L 5/0005* (2013.01); *H04L 5/0048* (2013.01); *H04L 27/2607* (2013.01);
(Continued)

(58) Field of Classification Search
CPC ................. H04L 5/0005; H04L 5/0048; H04L 27/2607; H04L 27/2636; H04L 27/364; H04W 24/02
See application file for complete search history.

(56) References Cited

U.S. PATENT DOCUMENTS

| 9,432,107 B2 | 8/2016 | Kim |
| 2011/0176632 A1 | 7/2011 | Jeong et al. |
| 2020/0145976 A1* | 5/2020 | Jiang ................... H04W 72/085 |

FOREIGN PATENT DOCUMENTS

| CN | 101815050 A | 8/2010 |
| CN | 101932073 A | 12/2010 |

(Continued)

OTHER PUBLICATIONS

CN Search Report in application No. 201711079561.5 dated Feb. 15, 2020.
CN First Office Action in Application No. 201711079561.5 dated Feb. 25, 2020.
(Continued)

*Primary Examiner* — Duc C Ho
(74) *Attorney, Agent, or Firm* — Maschoff Brennan

(57) ABSTRACT

A method and device in a UE and a base station used for wireless communications. The UE first receives a first signaling, and then transmits a first radio signal; the first signaling is used for determining K REs, and K first-type complex numbers are used for generating a baseband signal of the first radio signal through a baseband signal generation for generating an SC-FDMA baseband signal, a modulation scheme employed by the first radio signal is π/2-BPSK, K first-type parameters respectively correspond to the K first-type complex numbers, the K REs occupy contiguous subcarriers in frequency domain. The K first-type parameters are related to a center frequency of the contiguous subcarriers occupied by the K REs, each of the K first-type
(Continued)

parameters is related to a length of cyclic prefix of an RE onto which a corresponding first-type complex number is mapped. The present disclosure improves uplink coverage performance.

20 Claims, 13 Drawing Sheets

Related U.S. Application Data continuation of application No. PCT/CN2018/110190, filed on Oct. 15, 2018.

(51) Int. Cl.
  *H04L 27/36* (2006.01)
  *H04W 24/02* (2009.01)
(52) U.S. Cl.
  CPC ........ *H04L 27/2636* (2013.01); *H04L 27/364* (2013.01); *H04W 24/02* (2013.01)

(56) References Cited

FOREIGN PATENT DOCUMENTS

| | | |
|---|---|---|
| CN | 102055702 A | 5/2011 |
| CN | 103929816 A | 7/2014 |
| KR | 20140048055 A | 4/2014 |

OTHER PUBLICATIONS

CN Grant Action in Application No. 201711079561.5 dated Apr. 2, 2020.
3GPP Working Group. 3GPP; TSG-RAN; E-UTRA; Physical Channels and Modulation (Release 10). 3GPP TS 36.211 V10.1.0.(Mar. 31, 2011).
Samsung. Scaled Numerology for UL Control Channels. 3GPP TSG RAN WG1 NR Ad-Hoc Meeting, R1-1700954 (Jan. 20, 2017)V.
Nokia On PAPR/CM reduction techniques over QPSK/DFT-S-OFDM uplink. 3GPP TSG-RAN WG1 #87 (Nov. 18, 2016).
SR received in international application No. PCT/CN2018/110190, dated Dec. 14, 2018.

\* cited by examiner

METHOD AND DEVICE IN UE AND BASE STATION USED FOR WIRELESS COMMUNICATION

CROSS REFERENCE TO RELATED APPLICATIONS

This application is a continuation of U.S. patent Ser. No. 16/858,638, filed on Apr. 26, 2020, which is a continuation of International Application No. PCT/CN2018/110190, filed on Oct. 15, 2018, claiming the priority benefit of Chinese Patent Application No. CN 201711079561.5, filed on Nov. 6, 2017, the full disclosure of which is incorporated herein by reference.

BACKGROUND

Technical Field

The present disclosure relates to transmission schemes in wireless communication systems, and in particular to a method and a device for transmissions supporting $\pi/2$-BPSK or $\pi/4$-QPSK modulation schemes.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72th plenary session decided to conduct the study of New Radio (NR). The work Item (WI) of NR was approved at the 3GPP RAN #75th session to standardize the 5G NR techniques.

To ensure flexible adaptability to a variety of application scenarios, the wireless communication systems in the future, especially 5G NR, will support different kinds of Numerology, which means different subcarrier spacings, and various symbol time lengths and cyclic prefix (CP) lengths. Besides, in order to guarantee sufficient coverage performance, and to address the issue of uplink coverage due to limits of transmitting power in particular, it is agreed that Single Carrier Frequency Division Multiple Access (SC-FDMA) Waveform with low Peak to Average Power Ratio (PAPR) or Cubic Matric (CM) is supported in the process of WI standardization of 5G NR. Also, the modulation scheme of $\pi/2$-BPSK is supported in terms of DFT-s-OFDM waveform so as to further reduce PAPR or CM, thereby improving the coverage performance of uplink transmission and the efficiency of power amplifier.

SUMMARY $\pi/2$-BPSK and $\pi/4$-QPSK modulation schemes are respectively implemented through phase rotation of symbols based on conventional BPSK and QPSK modulation, which ensures as much as phase continuity and properties of constant envelope of modulated signals, so even after being subjected to filtering, or pulse shaping, these signals will still have low PAPR and the coverage performance still improved. The SC-FDMA system maintains some single-carrier properties, but is essentially in the form of multicarrier similar to OFDM, due to the utilization of transform precoding (generally realized by DFT, i.e., DFT-s-OFDM) or filtering in practice. In addition, a CP is inserted before each multicarrier symbol to counteract multipath interference. Generation of DFT-s-OFDM waveform and CP insertion as such will pose impact on the phase continuity and constant envelope properties of baseband signals under $\pi/2$-BPSK or $\pi/4$-QPSK modulation, which leads to increasing PAPR or CM, and will then nullify the improvement in coverage performance brought about by $\pi/2$-BPSK or $\pi/4$-QPSK modulation scheme.

To address the problem confronting the $\pi/2$-BPSK modulation or $\pi/4$-QPSK modulation scheme applied to DFT-s-OFDM waveform, the present disclosure provides a solution. It should be noted that if there is no conflict, the embodiments in a User Equipment (UE) of the present disclosure and the characteristics in the embodiments may be applied to a base station of the present disclosure, and vice versa. Further, the embodiments and the characteristics in the embodiments can be mutually combined if no conflict is incurred.

The present disclosure provides a method in a UE used for wireless communications, comprising:

receiving a first signaling; and transmitting a first radio signal;

herein, the first signaling is used for determining K Resource Elements (REs), K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

According to one aspect of the present disclosure, the above method is characterized in that the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

According to one aspect of the present disclosure, the above method is characterized in that among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

According to one aspect of the present disclosure, the above method is characterized in that when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

According to one aspect of the present disclosure, the above method is characterized in that there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

According to one aspect of the present disclosure, the above method is characterized in that the first bit block is used for generating K second-type complex numbers, respective products of the K second-type complex numbers and the K first-type parameters are used for generating the K first-type complex numbers.

According to one aspect of the present disclosure, the above method is characterized in that the first bit block comprises M code blocks, the M is an integer greater than 1, a first code block is one of the M code blocks, there are two consecutive bits in the first code block that are discrete in the first bit block.

According to one aspect of the present disclosure, the above method is characterized in comprising:

receiving a second signaling;

herein, the second signaling is used for determining a length of a cyclic prefix of each of the K REs.

The present disclosure provides a method in a base station used for wireless communication, comprising:

transmitting a first signaling; and receiving a first radio signal;

herein, the first signaling is used for determining K REs, K first-type complex numbers are respectively mapped onto the K REs, the K first-type complex numbers are used for generating the first radio signal, K first-type parameters respectively correspond to the K first-type complex numbers, the K first-type complex numbers are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

According to one aspect of the present disclosure, the above method is characterized in that the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

According to one aspect of the present disclosure, the above method is characterized in that among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

According to one aspect of the present disclosure, the above method is characterized in that when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

According to one aspect of the present disclosure, the above method is characterized in that there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

According to one aspect of the present disclosure, the above method is characterized in that the first bit block is used for generating K second-type complex numbers, respective products of the K second-type complex numbers and the K first-type parameters are used for generating the K first-type complex numbers.

According to one aspect of the present disclosure, the above method is characterized in that the first bit block comprises M code blocks, the M is an integer greater than 1, a first code block is one of the M code blocks, there are two consecutive bits in the first code block that are discrete in the first bit block.

According to one aspect of the present disclosure, the above method is characterized in further comprising:

transmitting a second signaling;

herein, the second signaling is used for determining a length of a cyclic prefix of each of the K REs.

The present disclosure provides a UE used for wireless communication, comprising:

a first receiver, receiving a first signaling; and a first transmitter, transmitting a first radio signal;

herein, the first signaling is used for determining K REs, K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

According to one aspect of the present disclosure, the above UE is characterized in that the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

According to one aspect of the present disclosure, the above UE is characterized in that among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

According to one aspect of the present disclosure, the above UE is characterized in that when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

According to one aspect of the present disclosure, the above UE is characterized in that there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

According to one aspect of the present disclosure, the above UE is characterized in that the first bit block is used for generating K second-type complex numbers, respective products of the K second-type complex numbers and the K first-type parameters are used for generating the K first-type complex numbers.

According to one aspect of the present disclosure, the above UE is characterized in that the first bit block comprises M code blocks, the M is an integer greater than 1, a first code block is one of the M code blocks, there are two consecutive bits in the first code block that are discrete in the first bit block.

According to one aspect of the present disclosure, the above UE is characterized in that the first receiver also receives a second signaling; the second signaling is used for determining a length of a cyclic prefix of each of the K REs.

The present disclosure provides a base station used for wireless communication, comprising:
a second transmitter, transmitting a first signaling; and
a second receiver, receiving a first radio signal;
herein, the first signaling is used for determining K Resource Elements (REs), K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

According to one aspect of the present disclosure, the above base station is characterized in that the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

According to one aspect of the present disclosure, the above base station is characterized in that among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

According to one aspect of the present disclosure, the above base station is characterized in that when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

According to one aspect of the present disclosure, the above base station is characterized in that there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

According to one aspect of the present disclosure, the above base station is characterized in that the first bit block is used for generating K second-type complex numbers, respective products of the K second-type complex numbers and the K first-type parameters are used for generating the K first-type complex numbers.

According to one aspect of the present disclosure, the above base station is characterized in that the first bit block comprises M code blocks, the M is an integer greater than 1, a first code block is one of the M code blocks, there are two consecutive bits in the first code block that are discrete in the first bit block.

According to one aspect of the present disclosure, the above station is characterized in that the second transmitter also transmits a second signaling; the second signaling is used for determining a length of a cyclic prefix of each of the K REs.

In one embodiment, the present disclosure has the following advantages:

The present disclosure provides a method for phase compensation in time domain: before performing transform precoding (which is generally implemented through DFT), the CP length applied by the resource mapping is used to compensate a phase of each multicarrier symbol in accordance with the frequency (generally referring to center frequency) of a signal, which has been modulated (if multi-antenna transmitter diversity is performed before DFT, the modulation is performed after precoding of the transmitter diversity), so as to ensure contiguous phase changes while decreasing PAPR and improving coverage performance.

The above method of time domain phase compensation is also applicable to an SC-FDMA signal generated through frequency conversion and filtering, offering more flexibility to its implementation.

The present disclosure provides a method for phase compensation in frequency domain: in between DFT and IFFT, the latter being used for generating a baseband signal, phase compensation is performed on each subcarrier according to the CP length in the subcarrier and frequency of the subcarrier. The method can reduce PAPR as well.

The phase compensation method in the present disclosure also takes into account cases where uplink frequency-hopping transmission is supported and data discontinuity is caused by insertion of a reference signal. By delicate designs such as resetting phase compensation at the beginning of frequency hopping and assuming that the same phase compensation is employed for the reference signal, the method better ensures low PAPR of SC-FDMA transmission and enhances coverage performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
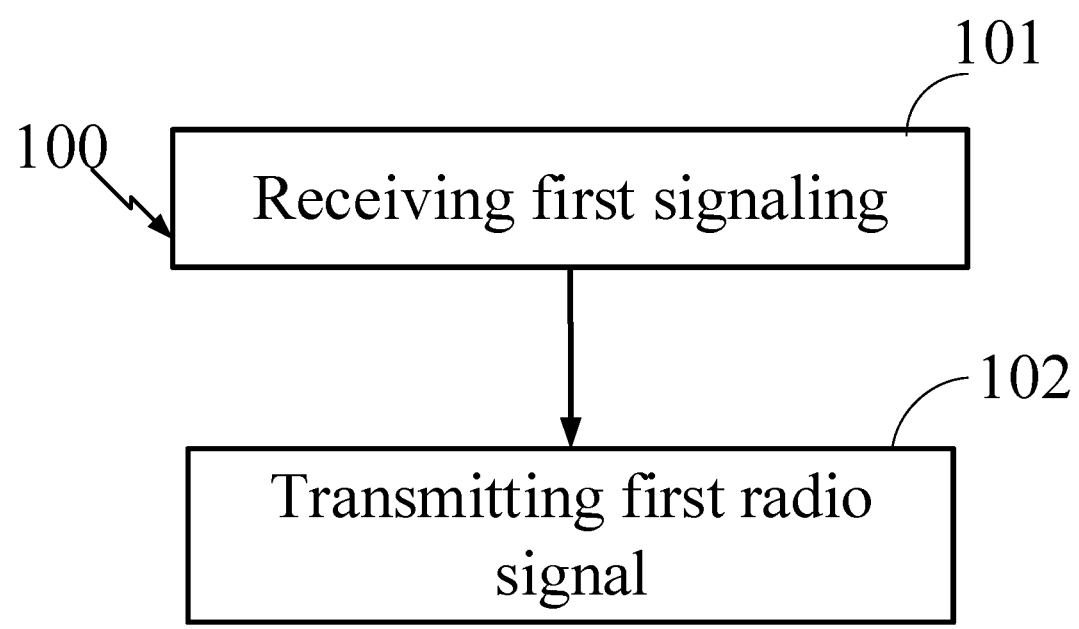
FIG. 1 illustrates a flowchart of transmission of a first signaling and a first radio signal according to one embodiment of the present disclosure.

Embodiment 1 illustrates a flowchart of transmission of a first signaling and a first radio signal according to one embodiment of the present disclosure, as shown in FIG. 1. In FIG. 1, each box represents a step. In Embodiment 1, the UE in the present disclosure first receives a first signaling in Step 101 and then transmits a first radio signal in Step 102; herein, the first signaling is used for determining K Resource Elements (REs), K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, each of the K REs occupies a subcarrier in frequency domain, and a multicarrier symbol in time domain, the multicarrier symbol comprising a cyclic prefix (CP).

In one embodiment, each of the K REs occupies an Orthogonal Frequency Division Multiplexing (OFDM) subcarrier in frequency domain, and an OFDM multicarrier symbol in time domain, the OFDM multicarrier symbol comprising a CP.

In one embodiment, each of the K REs occupies a Single Carrier Frequency Division Multiple Access (SC-FDMA) subcarrier in frequency domain, and an SC-FDMA multicarrier symbol in time domain, the SC-FDMA multicarrier symbol comprising a CP.

In one embodiment, REs occupying a same multicarrier symbol out of the K REs are distributed on consecutive subcarriers.

In one embodiment, the K REs are distributed on a same group of subcarriers in each multicarrier symbol.

In one embodiment, REs occupying a same multicarrier symbol out of the K REs are distributed on discrete subcarriers.

In one embodiment, there are REs out of the K REs which occupy two multicarrier symbols and are distributed on two different groups of subcarriers.

In one embodiment, CPs of the K REs are of equal length.

In one embodiment, there are two REs out of the K REs whose CP lengths are unequal.

In one embodiment, CPs of the K REs are Normal CPs.

In one embodiment, CPs of the K REs are Extended CPs.

In one embodiment, the first radio signal occupies the K REs.

In one embodiment, the K is equal to a positive integral multiple of 12, where the positive integral multiple is greater than 1.

In one embodiment, the K first-type complex numbers are respectively resource mapped onto the K REs.

In one embodiment, the K first-type complex numbers respectively occupy the K REs.

In one embodiment, the K first-type complex numbers are of a same modulus.

In one embodiment, the modulus of the K first-type complex numbers is related to a transmitting power of the first radio signal.

In one embodiment, a baseband signal of the first radio signal is generated by the K first-type complex numbers through baseband signal generation. In one subembodiment, the baseband signal generation is used for generating an SC-FDMA baseband signal. In another subembodiment, the baseband signal generation is implemented in accordance with the baseband signal generation specified in 3GPP TS38.211, section 5.3, or TS36.211, section 5.6.

In one embodiment, a baseband signal of the first radio signal is generated by the K first-type complex numbers through IFFT.

In one embodiment, the K first-type parameters are respectively used for changing phases of the K first-type complex numbers in polar coordinates.

In one embodiment, the K first-type parameters are unrelated to the content of bits in the first bit block.

In one embodiment, the phrase that the K first-type parameters are unrelated to the content of bits in the first bit block means that the K first-type parameters are only related to the K REs.

In one embodiment, the phrase that the K first-type parameters are unrelated to the content of bits in the first bit block means that the K first-type parameters are only related to at least one of a subcarrier spacing (SCS) of the K REs, a frequency domain position of the K REs, a position of the K REs in a carrier occupied by the K REs, or a length of a CP of the K REs.

In one embodiment, there exists a real number among the K first-type parameters.

In one embodiment, there are two first-type parameters out of the K first-type parameters that are equal.

In one embodiment, a frequency-domain position of the K REs are used for determining the K first-type parameters.

In one embodiment, any of the K first-type parameters is related to a frequency-domain position of an RE onto which a corresponding first-type complex number is mapped.

In one embodiment, any of the K first-type parameters is related to a center frequency of an RE mapped by a corresponding first-type complex number.

In one embodiment, any of the K first-type parameters is related to a time-domain position of an RE out of the K REs onto which a corresponding first-type complex number is mapped.

In one embodiment, a time domain position of one RE of the K REs among the K REs is used for determining a first-type parameter corresponding to a first-type complex number mapped onto the RE.

In one embodiment, a frequency domain position of the K REs refers to a distribution pattern of the K REs in frequency domain.

In one embodiment, the K REs occupy contiguous subcarriers in frequency domain; a frequency domain position of the K REs refers to a center frequency of the contiguous subcarriers occupied by the K REs.

In one embodiment, a frequency domain position of the K REs refers to a center frequency of the first radio signal in baseband.

In one embodiment, a frequency domain position of the K REs is related to an SCS of subcarriers occupied by the K REs.

In one embodiment, any of the K first-type parameters is related to a time domain position of an RE out of the K REs onto which a corresponding first-type complex number is mapped; a time-domain position of one RE of the K REs among the K REs refers to an index of a multicarrier symbol occupied by the RE among multicarrier symbols occupied by the K REs.

In one embodiment, any of the K first-type parameters is related to a time-domain position of an RE out of the K REs onto which a corresponding first-type complex number is mapped; a time-domain position of one RE of the K REs among the K REs refers to an order of a multicarrier symbol occupied by the RE among multicarrier symbols occupied by the K REs.

In one embodiment, the K first-type parameters are related to an SCS of subcarriers occupied by the K REs.

In one embodiment, the first signaling includes a physical layer signaling.

In one embodiment, the first signaling includes a higher layer signaling.

In one embodiment, the first signaling includes physical layer signaling and higher layer signaling.

In one embodiment, the first signaling comprises one or more fields of Downlink Control Information (DCI).

In one embodiment, the first signaling is transmitted through a Physical Downlink Control Channel (PDCCH).

In one embodiment, the first signaling comprises one or more Information Elements (IEs) in a Radio Resource Control (RRC) signaling.

In one embodiment, the first signaling comprises one or more fields of an IE in an RRC signaling.

In one embodiment, the first signaling is transmitted through a Physical Downlink Shared Channel (PDSCH).

In one embodiment, the first signaling comprises a Medium Access Control (MAC) Control Element (CE).

In one embodiment, the first signaling comprises one or more fields of a MAC CE.

In one embodiment, the first signaling comprises Uplink (UL) Grant contained in Message-2 (Msg-2).

In one embodiment, the first radio signal comprises an Uplink Shared Channel (UL-SCH).

In one embodiment, the first radio signal is transmitted through a Physical Uplink Shared Channel (PUSCH).

In one embodiment, the first radio signal is transmitted through a Physical Uplink Control Channel (PUCCH).

In one embodiment, the first radio signal carries a Msg-3.

In one embodiment, the first radio signal carries Uplink Control Information (UCI).

In one embodiment, a modulation scheme employed by the first radio signal is $\pi/2$-BPSK.

In one embodiment, a modulation scheme employed by the first radio signal is $\pi/4$-QPSK.

In one embodiment, the first signaling is used by the UE for determining the K REs.

In one embodiment, the first signaling indicates the K REs.

In one embodiment, the first bit block carries all or part of a Transport Block (TB).

In one embodiment, the first bit block carries one or more Code Blocks (CBs).

In one embodiment, the first bit block is obtained after part of or all bits in a TB are subjected to at least the first of Channel Coding, Interleaving, or Scrambling.

In one embodiment, the first bit block is obtained after UCI is subjected to Channel Coding.

In one embodiment, bits in the first bit block are sequentially arranged.

In one embodiment, the first bit block comprises a positive integer number of bits.

In one embodiment, the first bit block comprises K bits.

In one embodiment, the first bit block comprises K/2 bit(s).

Embodiment 2

Figure 2:
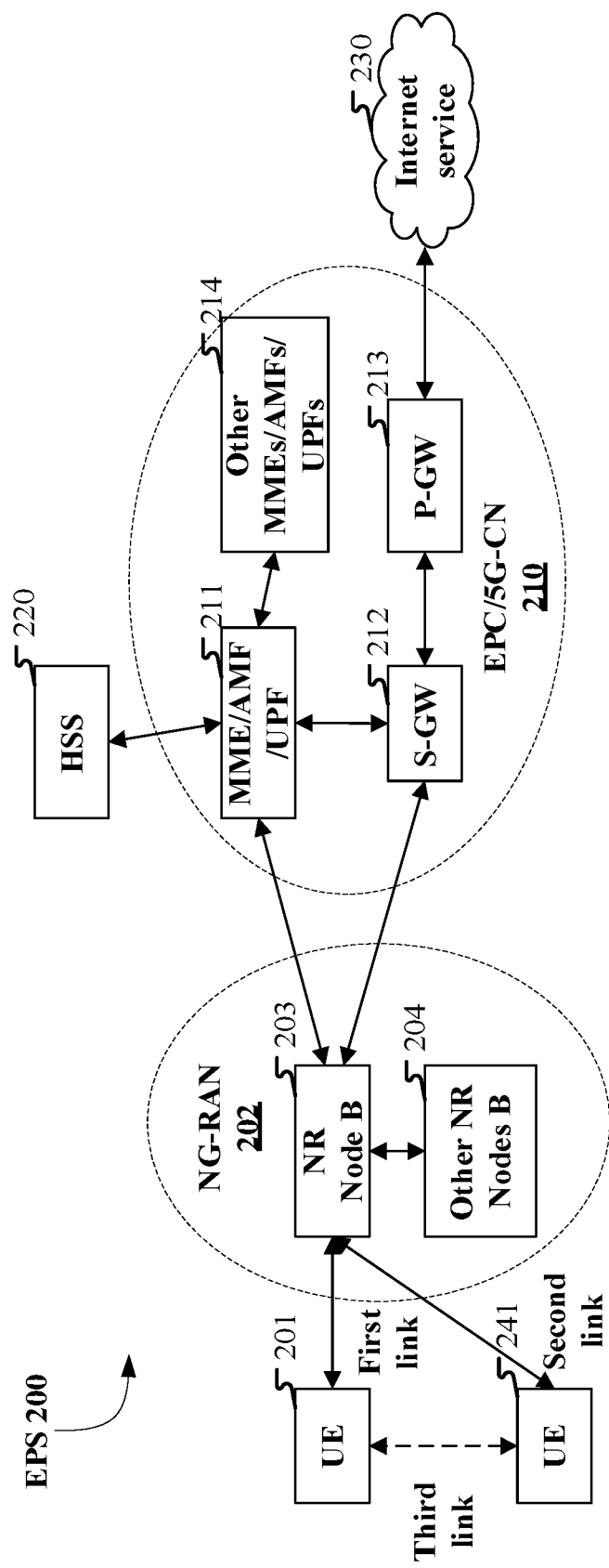
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-CoreNetwork (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services (PSS).

In one embodiment, the UE 201 corresponds to the UE in the present disclosure.

In one embodiment, the gNB 203 corresponds to the base station in the present disclosure.

In one embodiment, the UE 201 supports $\pi/2$-BPSK or $\pi/4$-QPSK modulation scheme.

In one embodiment, the gNB 203 supports $\pi/2$-BPSK or $\pi/4$-QPSK modulation scheme.

In one embodiment, the UE 201 supports SC-FDMA waveform.

In one embodiment, the gNB 203 supports SC-FDMA waveform.

Embodiment 3

Figure 3:
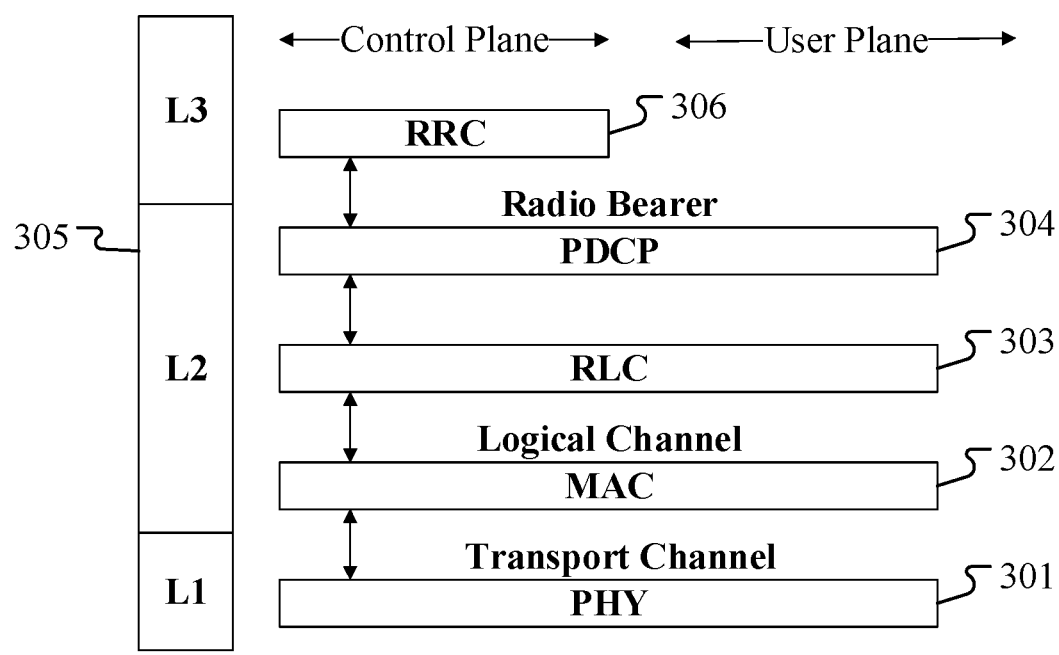
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the PHY 301.

In one embodiment, the first radio signal in the present disclosure is generated by the RRC sublayer 306.

In one embodiment, the first radio signal in the present disclosure is generated by the PHY 301.

In one embodiment, the second signaling in the present disclosure is generated by the RRC sublayer 306.

In one embodiment, the second signaling in the present disclosure is generated by the MAC sublayer 302.

In one embodiment, the second signaling in the present disclosure is generated by the PHY 301.

Embodiment 4

Figure 4:
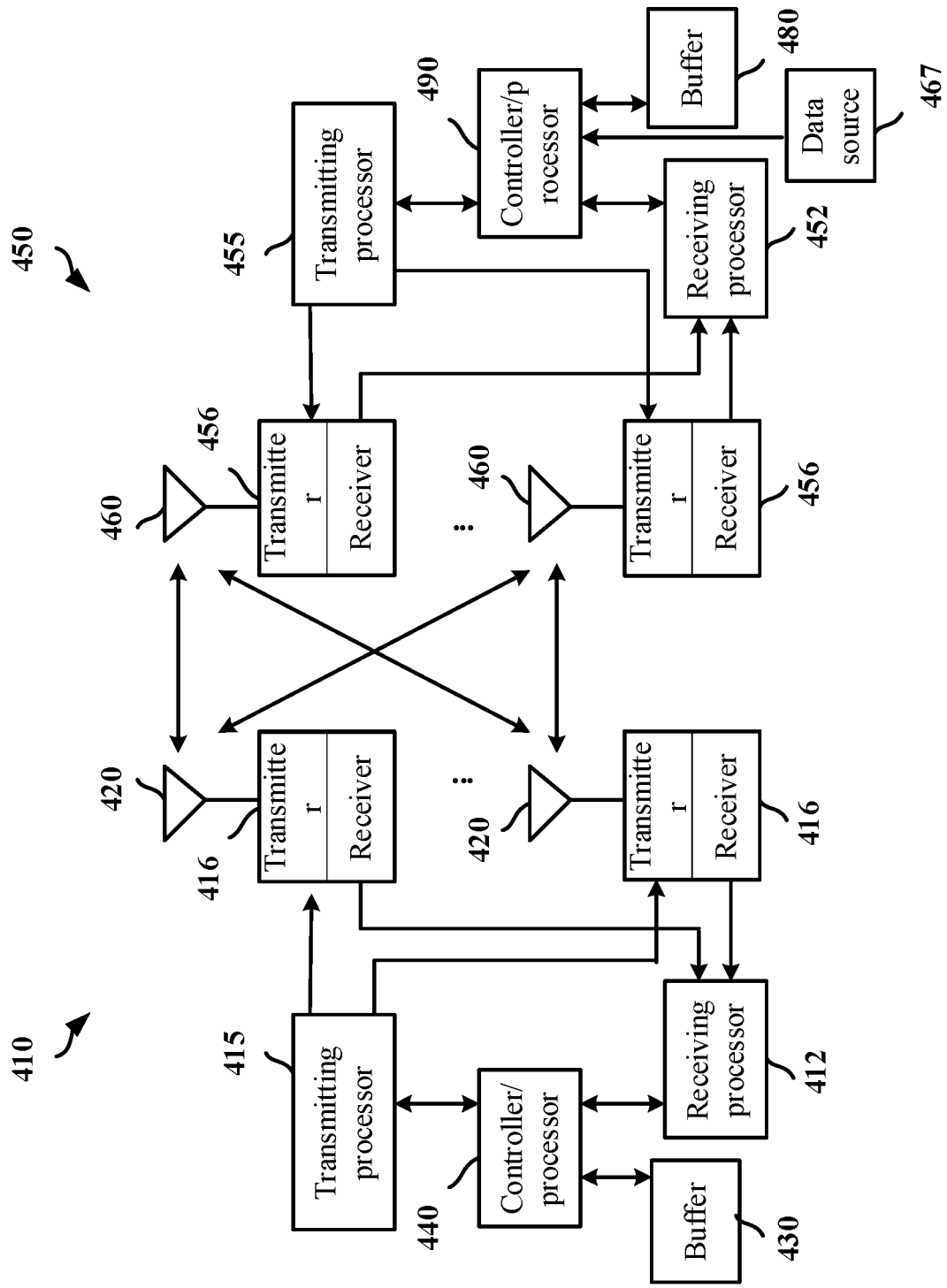
FIG. 4 illustrates a schematic diagram of a base station and a UE according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer protocols used for the user plane and the control plane. The higher layer packet may comprise data or control information, such as DL-SCH or UL-SCH. The transmitting processor 455 performs various signal transmitting processing functions of the L1 layer (that is, PHY), including coding, interleaving, scrambling, modulation, power control/allocation, precoding and physical layer signaling generation. The receiving processor 452 performs various signal receiving processing functions of the L1 layer (that is, PHY), including decoding, de-interleaving, descrambling, demodulation, de-precoding and physical layer control signaling extraction. The transmitter 456 is configured to convert a baseband signal provided by the transmitting processor 455 into a radio frequency (RF) signal to be transmitted via the antenna 460. The receiver 456 is configured to convert the RF signal received via the antenna 460 into a baseband signal to be provided to the receiving processor 452.

The base station (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440. The controller/processor 440 provides header compression and decompression, encryption and decryption, packet segmentation and reordering and multiplexing and demultiplexing between a logical channel and a transport channel, so as to implement the L2 layer protocols used for the user plane and the control plane. The higher layer packet may comprise data or control information, such as DL-SCH or UL-SCH. The transmitting processor 415 performs various signal transmitting processing functions of the L1 layer (that is, PHY), including coding, interleaving, scrambling, modulation, power control/allocation, precoding and physical layer signaling (i.e., synchronization signal, reference signal, etc.) generation. The receiving processor 412 performs various signal receiving processing functions of the L1 layer (that is, PHY), including decoding, de-interleaving, descrambling, demodulation, de-precoding and physical layer signaling extraction. The transmitter 416 is configured to convert a baseband signal provided by the transmitting processor 415 into a RF signal to be transmitted via the antenna 420. The receiver 416 is configured to convert the RF signal received via the antenna 420 into a baseband signal to be provided to the receiving processor 412.

In Downlink (DL) transmission, a higher layer packet is provided to the controller/processor 440. The controller/processor 440 implements the functionality of the L2 layer. In DL transmission, the controller/processor 440 provides header compression, encryption, packet segmentation and reordering and multiplexing between a logical channel and a transport channel, as well as radio resource allocation for the UE 450 based on varied priorities. The controller/processor 440 is also in charge of HARQ operation, retransmission of a lost packet, and a signaling to the UE 450, for instance, the first signaling and the second signaling are all generated in the controller/processor 440. The transmitting processor 415 performs signal processing functions of the L1 layer (that is, PHY), including decoding and interleaving, so as to promote Forward Error Correction (FEC) at the UE 450 side and modulation of baseband signal based on various modulation schemes (i.e., BPSK, QPSK). Modulation symbols are divided into parallel streams and each stream is mapped onto a corresponding multicarrier subcarrier and/or multicarrier symbol, which is later mapped from the transmitting processor 415 to the antenna 420 via the transmitter 416 to be transmitted in the form of RF signal. Corresponding channels of the first signaling and the second signaling of the present disclosure on physical layer are mapped from the transmitting processor 415 to target radio resources and then mapped from the transmitter 416 to the antenna 420 to be transmitted in the form of RF signals. At the receiving side, each receiver 456 receives an RF signal via a corresponding antenna 460; each receiver 456 recovers baseband information modulated to the RF carrier and provides the baseband information to the receiving processor 452. The receiving processor 452 performs signal receiving processing functions of the L1 layer. The signal receiving processing functions include reception of physical layer signals carrying the first signaling and the second signaling of the present disclosure, demodulation of multicarrier symbols in multicarrier symbol streams based on each modulation scheme (e.g., BPSK, QPSK), and then decoding and de-interleaving of the demodulated symbols so as to recover data or control signals transmitted by the base station (gNB) 410 on a physical channel, and the data or control signals are later provided to the controller/processor 490. The controller/processor 490 implements the functionality of the L2 layer. The controller/processor 490 may be associated with the memory 480 that stores program codes and data. The memory 480 can be called a computer readable medium.

In Uplink (UL) transmission, the data source 467 is used to provide the first radio signal of the present disclosure to the controller/processor 490. The data source 467 represents all protocol layers above the L2 layer. The controller/processor 490 provides header compression, encryption, packet segmentation and reordering and multiplexing between a logical channel and a transport channel based on radio resources allocation for the gNB 410, so as to implement the L2 layer protocols used for the user plane and the control plane. The controller/processor 490 is also in charge of HARQ operation, retransmission of a lost packet, and a signaling to the gNB 410. The transmitting processor 455 provides various signal transmitting processing functions used for the L1 layer (that is, PHY). The signal transmitting processing functions include coding and interleaving to promote FEC at the UE 450 as well as modulation of baseband signal based on each modulation scheme (such as π/2-BPSK or π/4-QPSK). Modulation symbols are divided into parallel streams and each stream is mapped onto a corresponding multicarrier subcarrier and/or multicarrier symbol (e.g., SC-FDMA subcarrier or multicarrier symbol), which is later mapped from the transmitting processor 455 to the antenna 460 via the transmitter 456 to be transmitted in the form of RF signal. The receiver 416 receives an RF signal via a corresponding antenna 420. Each receiver 416 recovers baseband information modulated to the RF carrier, and provides the baseband information to the receiving processor 412. The receiving processor 412 provides various signal receiving processing functions used for the L1 layer (that is, PHY). The signal receiving processing functions include acquisition of multicarrier symbol streams, demodulation of multicarrier symbols in the multicarrier symbol streams based on each modulation scheme (e.g., π/2-BPSK modulation or π/4-QPSK modulation), and then decoding and de-interleaving of the demodulated symbols so as to recover data and/or control signals originally transmitted by the UE 450 on a physical channel. And the data and/or control signals are later provided to the controller/processor 440. The controller/processor 440 implements the functionality of the L2 layer. The controller/processor 440 may be associated with the memory 430 that stores program codes and data. The memory 430 can be called a computer readable medium.

In one embodiment, the UE 450 comprises at least one processor and at least one memory, the at least one memory comprises computer program codes; the at least one memory and the computer program codes are configured to be used in collaboration with the at least one processor, the UE 450 at least receives a first signaling; and transmits a first radio signal; herein, the first signaling is used for determining K REs, K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, the UE 450 comprises a memory that stores computer readable instruction program, the computer readable instruction program generates an action when executed by at least one processor, the action includes: receiving a first signaling; and transmitting a first radio signal; herein, the first signaling is used for determining K Resource Elements (REs), K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, the eNB 410 comprises at least one processor and at least one memory, the at least one memory comprises computer program codes; the at least one memory and the computer program codes are configured to be used in collaboration with the at least one processor. The eNB 450 at least transmits a first signaling; and receives a first radio signal; herein, the first signaling is used for determining K REs, K first-type complex numbers are respectively mapped onto the K REs, the K first-type complex numbers are used for generating the first radio signal, K first-type parameters respectively correspond to the K first-type complex numbers, the K first-type complex numbers are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, the eNB 410 comprises a memory that stores computer readable instruction program, the computer readable instruction program generates an action when executed by at least one processor, the action includes: transmitting a first signaling; and receiving a first radio signal; herein, the first signaling is used for determining K REs, K first-type complex numbers are respectively mapped onto the K REs, the K first-type complex numbers are used for generating the first radio signal, K first-type parameters respectively correspond to the K first-type complex numbers, the K first-type complex numbers are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, the UE 450 corresponds to the UE in the present disclosure.

In one embodiment, the gNB 410 corresponds to the base station in the present disclosure.

In one embodiment, the receiver 456 (comprising the antenna 460), the receiving processor 452 and the controller/processor 490 are used in the present disclosure for receiving a first signaling.

In one embodiment, the receiver 456 (comprising the antenna 460), the receiving processor 452 and the controller/processor 490 are used in the present disclosure for receiving a second signaling.

In one embodiment, the transmitter 456 (comprising the antenna 460), the transmitting processor 455 and the controller/processor 490 are used in the present disclosure for transmitting a first radio signal.

In one embodiment, the transmitter 416 (comprising the antenna 420), the transmitting processor 415 and the controller/processor 440 are used in the present disclosure for transmitting a first signaling.

In one embodiment, the transmitter 416 (comprising the antenna 420), the transmitting processor 415 and the controller/processor 440 are used in the present disclosure for transmitting a second signaling.

In one embodiment, the receiver 416 (comprising the antenna 420), the receiving processor 412 and the controller/processor 440 are used in the present disclosure for transmitting a first radio signal.

Embodiment 5

Figure 5:
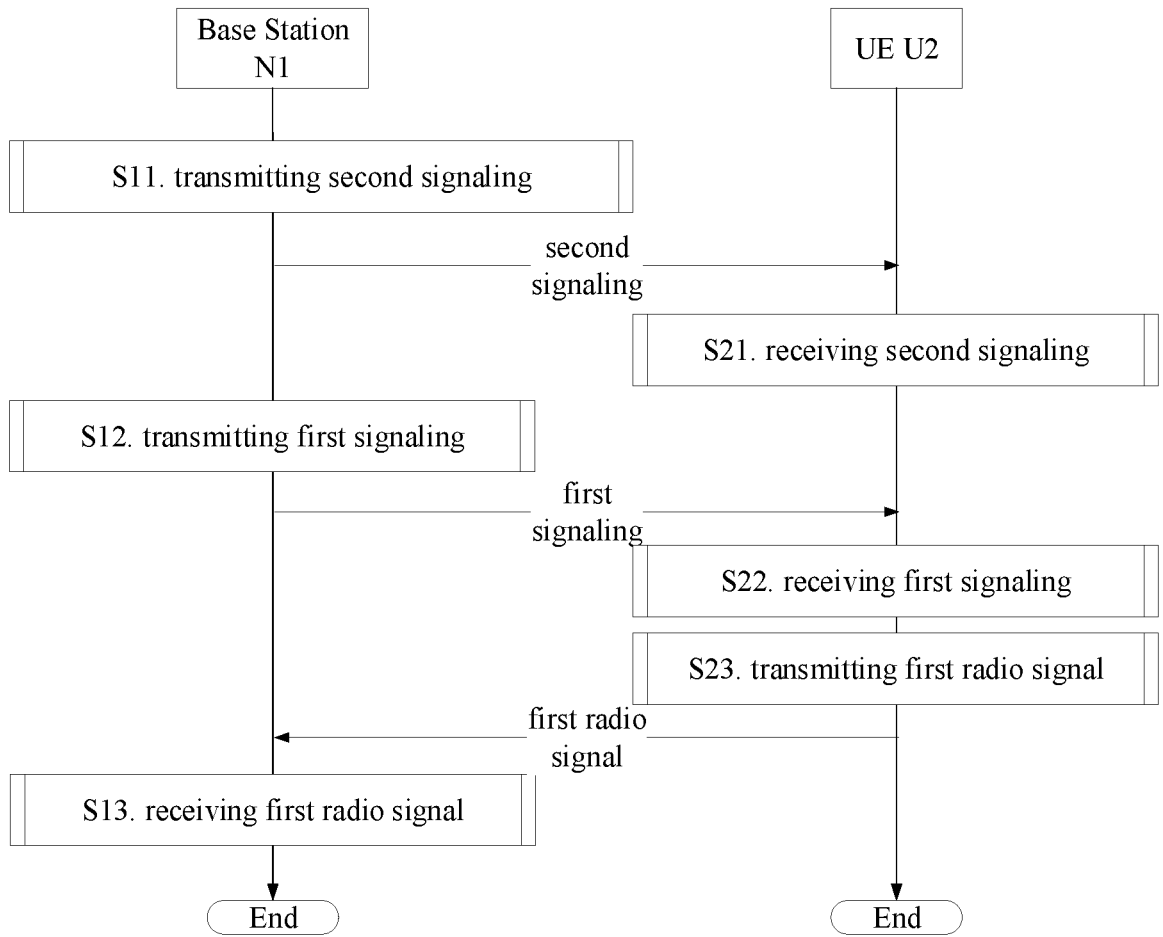
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a base station N1 is a maintenance base station for a serving cell of a UE U2.

The base station N1 transmits a second signaling in step S11, transmits a first signaling in step S12, and receives a first radio signal in step S13.

The UE U2 receives a second signaling in step S21, receives a first signaling in step S22, and transmits a first radio signal in step S23.

In Embodiment 5, the first signaling is used for determining K Resource Elements (REs), K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain. The second signaling is used for determining the length of a cyclic prefix of each of the K REs.

In one embodiment, the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

In one embodiment, among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

In one embodiment, when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

In one embodiment, there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

In one embodiment, the first bit block is used for generating K second-type complex numbers, respective products of the K second-type complex numbers and the K first-type parameters are used for generating the K first-type complex numbers.

In one embodiment, the first bit block comprises M code blocks, the M is an integer greater than 1, a first code block is one of the M code blocks, there are two consecutive bits in the first code block that are discrete in the first bit block.

In one embodiment, the second signaling indicates the Numerology of the K REs.

In one embodiment, the second signaling indicates a Bandwidth Part (BWP) to which the K REs belong.

In one embodiment, the second signaling indicates a subcarrier spacing (SCS) of subcarriers occupied by the K REs.

In one embodiment, the second signaling is used by the UE for determining a length of a cyclic prefix of each of the K REs.

In one embodiment, the second signaling indicates a length of a cyclic prefix of each of the K REs.

In one embodiment, the second signaling includes a physical layer signaling.

In one embodiment, the second signaling includes a higher layer signaling.

In one embodiment, the second signaling includes a physical layer signaling and a higher layer signaling.

In one embodiment, the second signaling comprises one or more fields of DCI.

In one embodiment, the second signaling is transmitted through a PDCCH.

In one embodiment, the second signaling comprises one or more IEs in an RRC signaling.

In one embodiment, the second signaling comprises one or more fields of an IE in an RRC signaling.

In one embodiment, the second signaling is transmitted through a PDSCH.

In one embodiment, the second signaling comprises a MAC CE.

In one embodiment, the second signaling comprises one or more fields of a MAC CE.

In one embodiment, the second signaling comprises UL Grant contained in Msg-2.

In one embodiment, the first signaling and the second signaling comprises a same signaling.

In one embodiment, the first signaling and the second signaling are totally different signalings.

Embodiment 6

Figure 6:
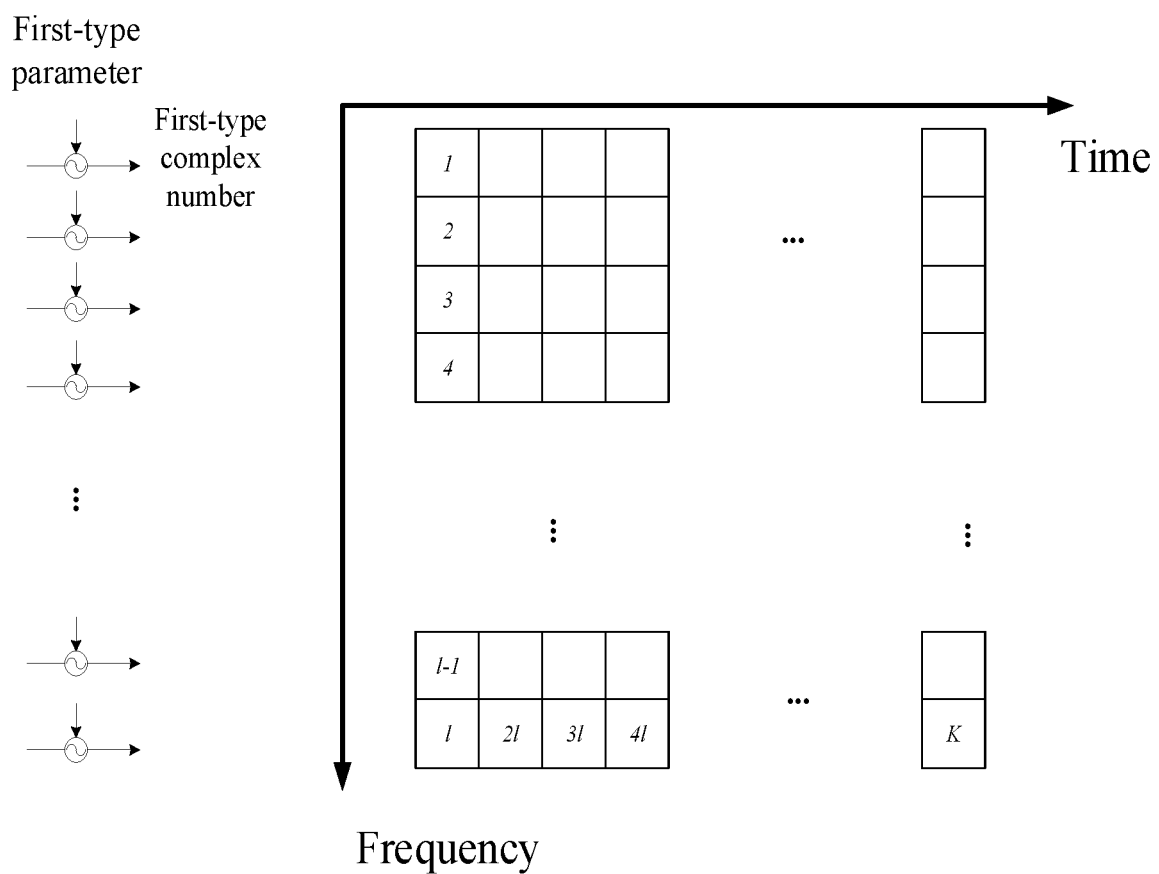
FIG. 6 illustrates a schematic diagram of relations between K first-type complex numbers and K first-type parameters according to one embodiment of the present disclosure.

Embodiment 6 illustrates a schematic diagram of relations between K first-type complex numbers and K first-type parameters according to one embodiment of the present disclosure, as shown in FIG. 6. In FIG. 6, the horizontal axis represents time, and the vertical axis represents frequency. Each box represents one of the K REs. An input to an arrow above each transformation symbol is one of K first-type parameters, while an output from the transformation is one of K first-type complex numbers.

In Embodiment 6, K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, a baseband signal of the first radio signal is generated by the K first-type complex numbers through baseband signal generation. In one subembodiment, the baseband signal generation is used for generating an SC-FDMA baseband signal. In another subembodiment, the baseband signal generation is implemented in accordance with the baseband signal generation specified in 3GPP TS38.211, section 5.3, or TS36.211, section 5.6.

In one embodiment, a baseband signal of the first radio signal is generated by the K first-type complex numbers through IFFT.

In one embodiment, the K first-type parameters are respectively used for determining phases of the K first-type complex numbers in polar coordinates.

In one embodiment, the K first-type parameters are unrelated to the content of bits in the first bit block.

In one embodiment, the phrase that the K first-type parameters are unrelated to the content of bits in the first bit block means that the K first-type parameters are only related to the K REs.

In one embodiment, the phrase that the K first-type parameters are unrelated to the content of bits in the first bit block means that the K first-type parameters are only related to at least one of an SCS of the K REs, a frequency domain position of the K REs, a position of the K REs in a carrier occupied by the K REs, or a length of a CP of the K REs.

In one embodiment, there exists a real number among the K first-type parameters.

In one embodiment, there are two first-type parameters out of the K first-type parameters that are equal.

In one embodiment, the K first-type parameters are related to the SCS of subcarriers occupied by the K REs.

Embodiment 7

Figure 7:
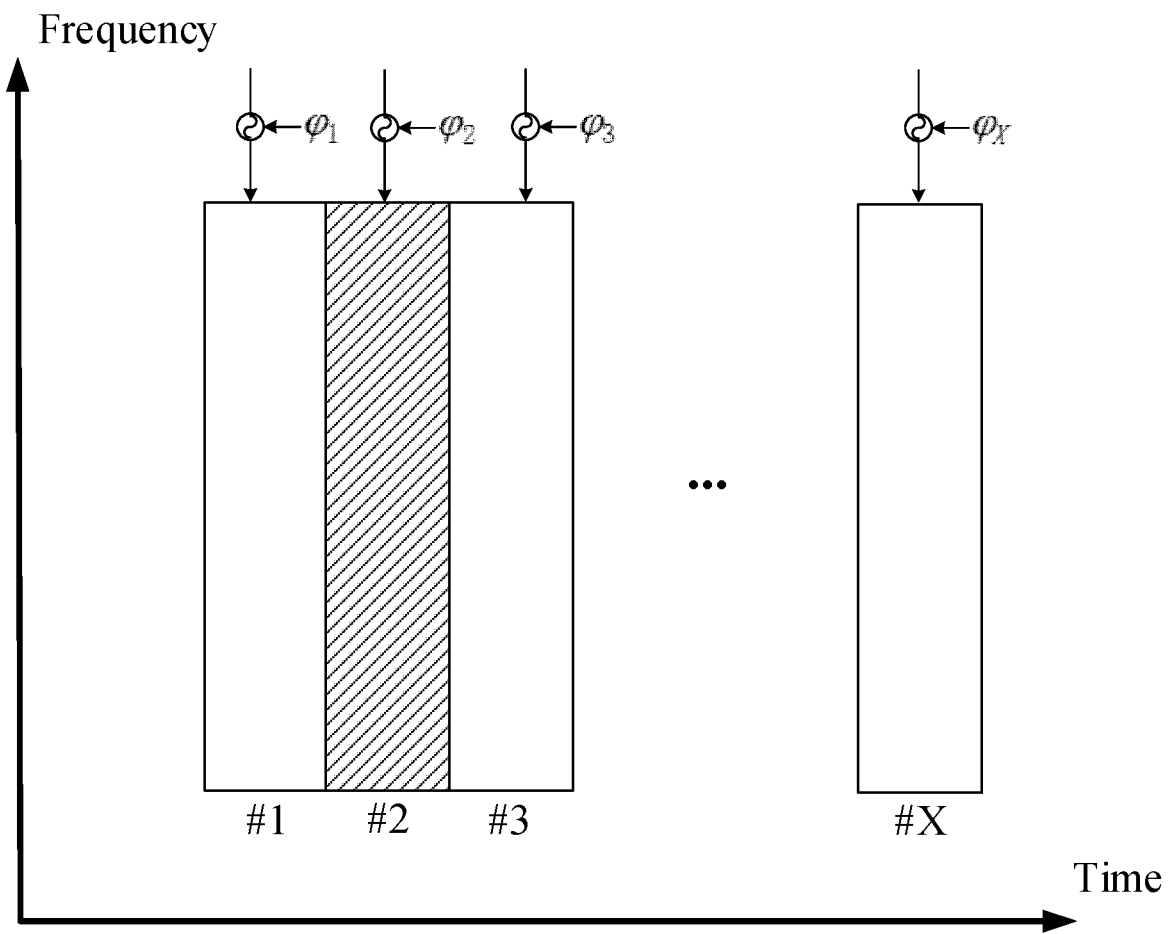
FIG. 7 illustrates a schematic diagram of X multicarrier symbols according to one embodiment of the present disclosure.

Embodiment 7 illustrates a schematic diagram of X multicarrier symbols according to one embodiment of the present disclosure, as shown in FIG. 7. In FIG. 7, the horizontal axis represents time, while the vertical axis represents frequency. Each square represents a multicarrier symbol; the slash-filled square represents a target multicarrier symbol; $\varphi_1, \ldots, \varphi_X$ respectively represent a first-type parameter corresponding to each of multicarrier symbol.

In Embodiment 7, the K REs of the present disclosure are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

In one embodiment, the X multicarrier symbols are consecutive in time domain.

In one embodiment, the X multicarrier symbols are discrete in time domain.

In one embodiment, a first-type parameter corresponding to a first-type complex number mapped onto an RE comprised by the target RE group is related to a characteristic frequency of frequency domain resources occupied by the target RE group.

In one subembodiment, the characteristic frequency is a center frequency.

In one subembodiment, the characteristic frequency is a lowest frequency.

In one subembodiment, the characteristic frequency is a highest frequency.

In one subembodiment, the characteristic frequency is a frequency obtained after a center frequency is shifted by a fixed offset.

In one embodiment, a first-type parameter corresponding to a first-type complex number mapped onto an RE comprised by the target RE group is unrelated to a number of REs in the target RE group.

In one embodiment, a first-type parameter corresponding to a first-type complex number mapped onto an RE comprised by the target RE group is unrelated to an SCS of subcarriers of the target RE group.

Embodiment 8

Figure 8:
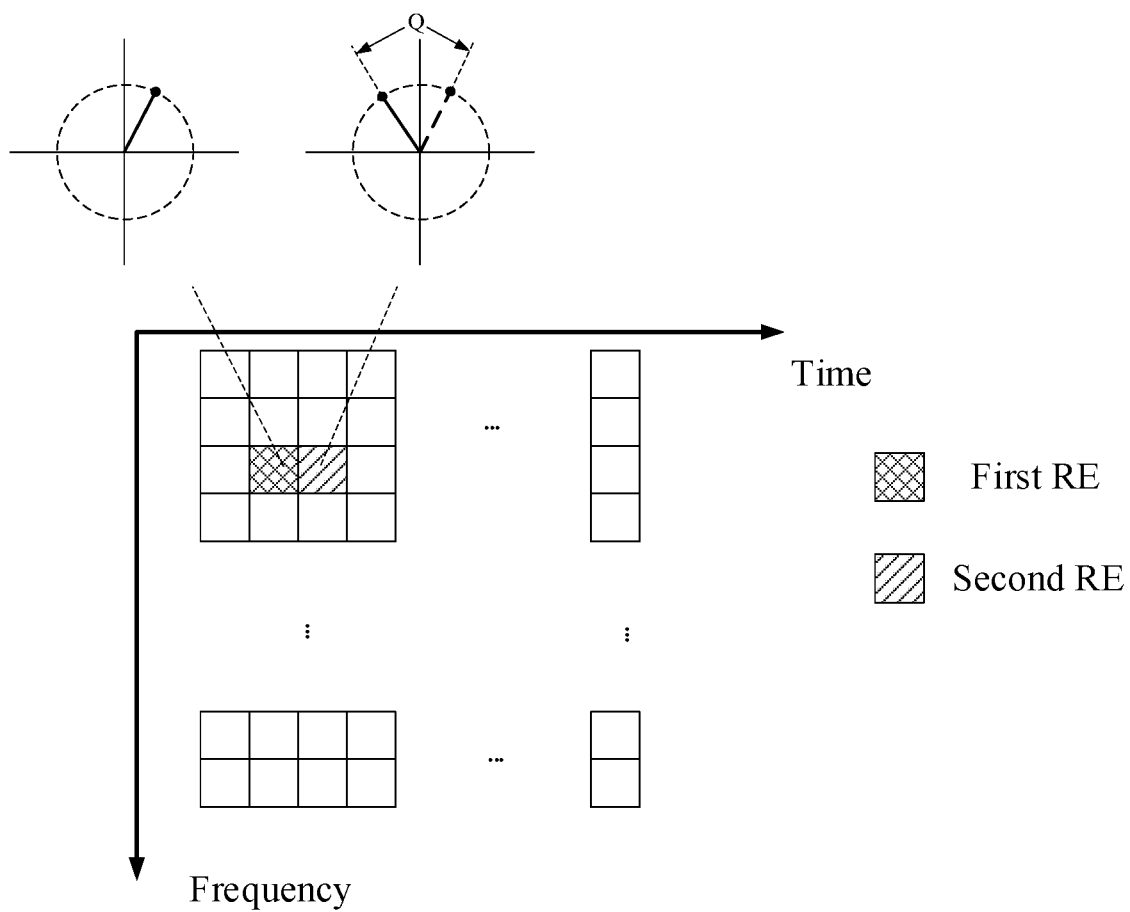
FIG. 8 illustrates a schematic diagram of a relation between a first RE and a second RE according to one embodiment of the present disclosure.

Embodiment 8 illustrates a schematic diagram of a relation between a first RE and a second RE according to one embodiment of the present disclosure, as shown in FIG. 8. In FIG. 8, the horizontal axis represents time, and the vertical axis represents frequency. Each small box represents one of K REs; the cross-filled box represents a first RE, while the slash-filled box represents a second RE; a first-type parameter corresponding to the first RE and a first-type parameter corresponding to the second RE are respectively represented by full-line vectors in polar coordinates, with the endpoint being a circle dot.

In Embodiment 8, there are a first RE and a second RE of the present disclosure, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE; when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

In one embodiment, a multicarrier symbol to which the first RE belongs and a multicarrier symbol to which the second RE belongs are two adjacent multicarrier symbols in time domain.

In one embodiment, a multicarrier symbol to which the first RE belongs and a multicarrier symbol to which the second RE belongs are two non-adjacent multicarrier symbols in time domain.

In one embodiment, a CP in the first RE and a CP in the second RE are of equal length.

In one embodiment, a CP in the first RE and a CP in the second RE are of unequal lengths.

In one embodiment, for a given subcarrier occupied by the second RE, the angle of the Q in polar coordinates is linear with a length of a CP in the second RE.

In one embodiment, the frequency-domain position of the second RE refers to a center frequency of a subcarrier occupied by the second RE.

In one embodiment, the frequency-domain position of the second RE refers to a center frequency of a subcarrier occupied by the second RE in a baseband.

In one embodiment, the frequency-domain position of the second RE refers to an absolute position of the second RE in baseband frequency domain.

In one embodiment, a frequency-domain position of REs out of the K REs which occupy a same multicarrier symbol as the second RE refers to a center frequency of frequency domain resources occupied by the REs out of the K REs which occupies a same multicarrier symbol as the second RE.

In one embodiment, a frequency-domain position of REs out of the K REs which occupy a same multicarrier symbol as the second RE refers to a center frequency of a baseband of frequency domain resources occupied by the RE out of the K REs which occupies a same multicarrier symbol as the second RE.

In one embodiment, a frequency-domain position of REs out of the K REs which occupy a same multicarrier symbol as the second RE refers to a frequency-domain position of frequency domain resources occupied by the first radio signal.

In one embodiment, a frequency-domain position of REs out of the K REs which occupy a same multicarrier symbol as the second RE refers to a frequency-domain position of a characteristic frequency of frequency domain resources occupied by the first radio signal. In one subembodiment, the characteristic frequency is a center frequency. In another subembodiment, the characteristic frequency is a frequency obtained after a center frequency is shifted by a fixed offset.

In one embodiment, a frequency-domain position of REs of the K REs which occupy a same multicarrier symbol as the second RE refers to a center frequency of frequency domain resources occupied by the first radio signal in baseband.

In one embodiment, the Q is obtained through the following formula:

$$Q = e^{j2\pi f(N+N_{CP})}$$

Herein, N is a length of a data symbol in the first RE; $N_{CP}$ is a length of a CP in the second RE; f is a center frequency of frequency domain resources occupied by REs out of the K REs which occupy a same multicarrier symbol as the second RE.

In one embodiment, the Q is obtained through the following formula:

$$Q=e^{j2\pi f(N+N_{CP})}$$

Herein, N is a length of a data symbol in the first RE; $N_{CP}$ is a length of a CP in the second RE; f is a center frequency of a subcarrier occupied by the second RE.

In one embodiment, the P is equal to 1.

In one embodiment, the P is not equal to 1.

In one embodiment, the modulus of the P is equal to 1.

In one embodiment, the P is a complex number whose modulus is equal to 1 and phase in polar coordinates is larger than 0.

In one embodiment, a length of a CP of the first RE is greater than a length of a CP contained in a multicarrier symbol other than a multicarrier symbol occupied by the first RE among the multicarrier symbols occupied by the K REs.

In one embodiment, CPs of multicarrier symbols occupied by the K REs are of equal length.

Embodiment 9

Figure 9:
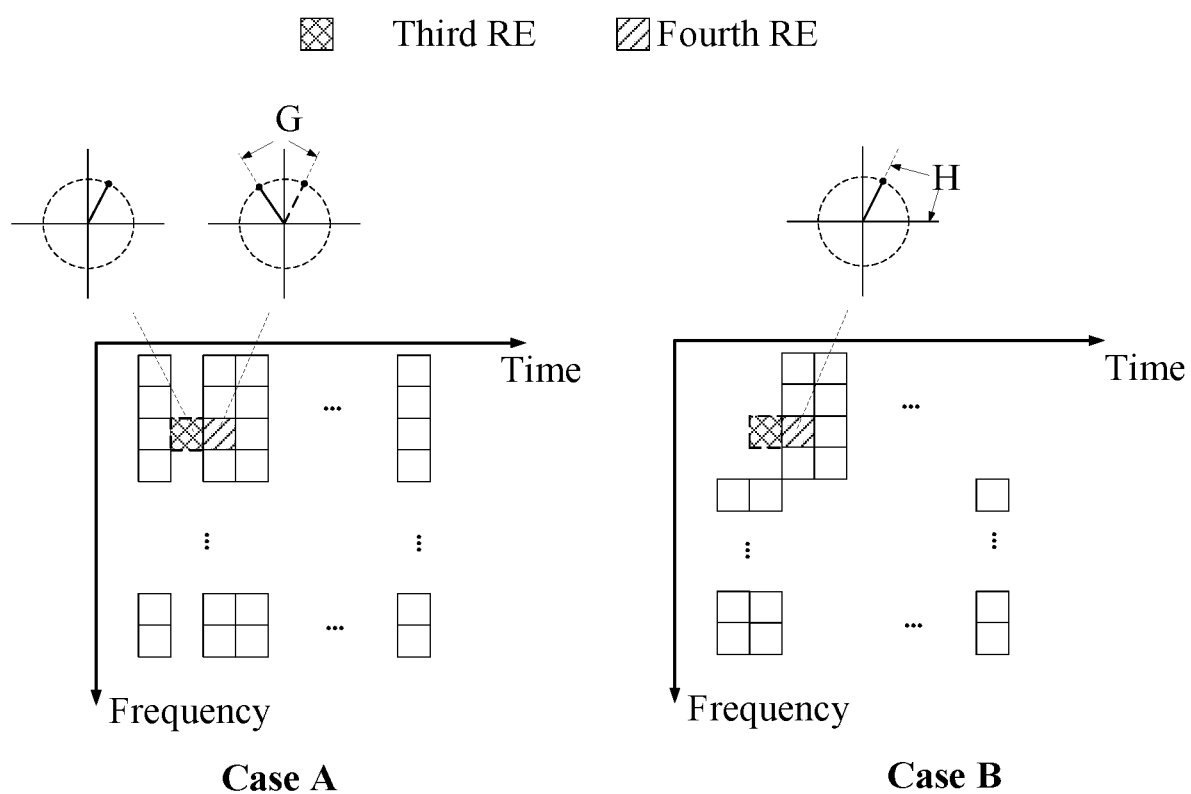
FIG. 9 illustrates a schematic diagram of a relation between a third RE and a fourth RE according to one embodiment of the present disclosure.

Embodiment 9 illustrates a schematic diagram of a relation between a third RE and a fourth RE according to one embodiment of the present disclosure, as shown in FIG. 9. In FIG. 9, the horizontal axis represents time, and the vertical axis represents frequency. Each small box framed with solid lines represents one of K REs; the box filled with crosses represents a third RE, and the box filled with slashes represents a fourth RE. in Case A, a virtual parameter is a vector in polar coordinates corresponding to the third RE, with a circle dot being the endpoint; in Case B, a first-type parameter corresponding to the fourth RE is a vector in polar coordinates corresponding to the fourth RE, with a circle dot being the endpoint.

In Embodiment 9, there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

In one embodiment, an angle of the G in polar coordinates is also related to at least one of frequency domain resources occupied by the fourth RE or frequency domain resources occupied by the first radio signal.

In one embodiment, the H is equal to 1.

In one embodiment, the H is unequal to 1.

In one embodiment, the modulus of the H is equal to 1.

In one embodiment, the H is a complex number whose modulus is 1 and whose phase in polar coordinates is greater than 0.

In one embodiment, the fourth RE is one of the K REs other than an RE occupying an earliest multicarrier symbol.

In one embodiment, the first radio signal starts frequency hopping from a multicarrier symbol occupied by the fourth RE.

In one embodiment, the third RE is used for transmitting an uplink reference signal.

In one embodiment, the third RE is used for transmitting an Uplink Demodulation Reference Signal (UL DMRS).

In one embodiment, the third RE is used for transmitting an Uplink Sounding Reference Signal (UL SRS).

In one embodiment, the third RE is scheduled for transmission of user equipment other than the UE.

In one embodiment, the third RE is not scheduled for transmission.

In one embodiment, an RE occupying a same subcarrier as the third RE but is on a previous multicarrier symbol belongs to the K REs.

In one embodiment, an RE occupying a same subcarrier as the third RE but is on a previous multicarrier symbol is outside the K REs.

In one embodiment, the virtual parameter is a first-type parameter obtained by the UE assuming that the third RE is used for transmitting the first radio signal.

In one embodiment, a fifth RE is an RE occupying a same subcarrier as the third RE but is on a previous multicarrier symbol. The fifth RE is one of the K REs, the virtual parameter $e^{\varphi 3}$ is obtained through the following formula:

$$e^{\varphi 3}=e^{\varphi 5}\cdot e^{j2\pi f(N+N_{CP})}$$

Herein, $e^{\varphi 3}$ is a first-type parameter corresponding to a first-type complex number mapped onto the fifth RE; N is a length of a data symbol in the fifth RE; $N_{CP}$ is a length of a CP in the third RE; f is a center frequency of a subcarrier occupied by the third RE.

In one embodiment, a fifth RE is an RE occupying a same subcarrier as the third RE but is on a previous multicarrier symbol. The fifth RE is one of the K REs, the virtual parameter $e^{\varphi 3}$ is obtained through the following formula:

$$e^{\varphi 3}=e^{\varphi 5}\cdot e^{j2\pi f(N+N_{CP})}$$

In one embodiment, $e^{\varphi 3}$ is a first-type parameter corresponding to a first-type complex number mapped onto the fifth RE; N is a length of a data symbol in the fifth RE; $N_{CP}$ is a length of a CP in the third RE; f is a center frequency of the first radio signal.

In one embodiment, the G is obtained through the following formula:

$$G=e^{j2\pi f(N+N_{CP})}$$

Herein, N is a length of a data symbol in the third RE; $N_{CP}$ is a length of a CP in the fourth RE; f is a center frequency of frequency domain resources occupied by REs out of the K REs occupying a same multicarrier symbol as the fourth RE.

In one embodiment, the G is obtained through the following formula:

$$G=e^{j2\pi f(N+N_{CP})}$$

Herein, N is a length of a data symbol in the third RE; $N_{CP}$ is a length of a CP in the fourth RE; f is a center frequency of a subcarrier occupied by the fourth RE.

Embodiment 10

Figure 10:
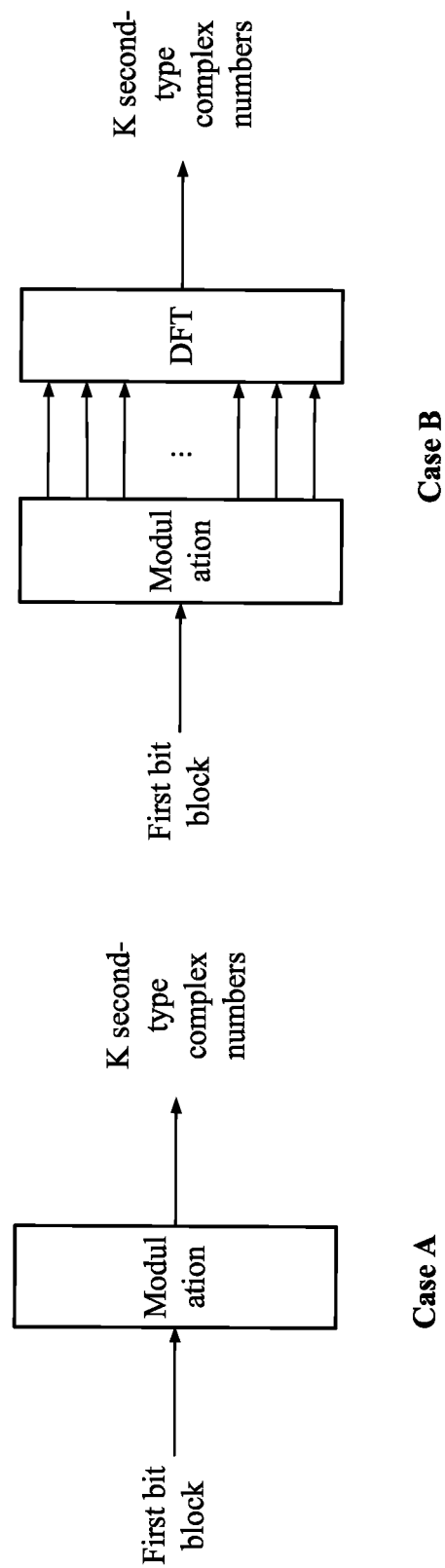
FIG. 10 illustrates a schematic diagram of a relation between a first bit block and K second-type complex numbers according to one embodiment of the present disclosure.

Embodiment 10 illustrates a schematic diagram of a relation between a first bit block and K second-type complex numbers according to one embodiment of the present disclosure, as shown in FIG. 10. In FIG. 10, the block diagram in case A represents modulation, while the two block diagrams in case B respectively represent modulation and Discrete Fourier Transform (DFT).

In Embodiment 10, the first bit block in the present disclosure is used for generating K second-type complex numbers, respective products of the K second-type complex numbers and the K first-type parameters are used for generating the K first-type complex numbers in the present disclosure.

In one embodiment, the K second-type complex numbers are generated by bits in the first bit block sequentially subjected to at least the first of modulation, layer mapping, precoding or transform precoding. In one subembodiment, the modulation is $\pi/2$-BPSK; in one subembodiment, the modulation is $\pi/4$-QPSK; in one subembodiment, the precoding is Alamouti-based transmit diversity; in one subembodiment, the precoding is Single Carrier Space Frequency Block Code (SC-SFBC); in one subembodiment, the precoding is Single Carrier Space Time Block Code (SC-STBC); in one subembodiment, the transform precoding is pursuant to the definition of transform precoding in 3GPP TS38.211, section 6.3.1.4, or 3GPP TS 36.211, section 5.3.3; in one subembodiment, the transform precoding is realized based on DFT.

In one embodiment, bits in the first bit block are modulated based on $\pi/2$-BPSK modulation to obtain the K second-type complex numbers.

In one embodiment, the K second-type complex numbers are obtained by bits in the first bit block sequentially through $\pi/2$-BPSK modulation and layer mapping.

In one embodiment, the K second-type complex numbers are obtained by bits in the first bit block sequentially through $\pi/2$-BPSK modulation, layer mapping and precoding. In one subembodiment, the precoding is Alamouti-based transmit diversity; in one subembodiment, the precoding is Single Carrier Space Frequency Block Code (SC-SFBC); in one subembodiment, the precoding is Single Carrier Space Time Block Code (SC-STBC).

In one embodiment, the K second-type complex numbers are obtained by bits in the first bit block sequentially through $\pi/2$-BPSK modulation and transform precoding. The transform precoding is pursuant to the definition of transform precoding in 3GPP TS38.211, section 6.3.1.4, or 3GPP TS 36.211, section 5.3.3.

In one embodiment, the K second-type complex numbers are obtained by bits in the first bit block sequentially through $\pi/2$-BPSK modulation, layer mapping and transform precoding. The transform precoding is pursuant to the definition of transform precoding in 3GPP TS38.211, section 6.3.1.4, or 3GPP TS 36.211, section 5.3.3.

In one embodiment, the K second-type complex numbers are obtained by bits in the first bit block sequentially through $\pi/2$-BPSK modulation, layer mapping, precoding and transform precoding. The transform precoding is pursuant to the definition of transform precoding in 3GPP TS38.211, section 6.3.1.4, or 3GPP TS 36.211, section 5.3.3. In one subembodiment, the precoding is Alamouti-based transmit diversity; in one subembodiment, the precoding is SC-SFBC; in one subembodiment, the precoding is SC-STBC.

In one embodiment, the K second-type complex numbers are obtained by bits in the first bit block through $\pi/4$-QPSK modulation.

In one embodiment, the K second-type complex numbers are obtained by bits in the first bit block sequentially through $\pi/4$-QPSK modulation and layer mapping.

In one embodiment, the K second-type complex numbers are obtained by bits in the first bit block sequentially through $\pi/4$-QPSK modulation, layer mapping and precoding. In one subembodiment, the precoding is Alamouti-based transmit diversity; in one subembodiment, the precoding is SC-SFBC; in one subembodiment, the precoding is SC-STBC.

In one embodiment, the K second-type complex numbers are obtained by bits in the first bit block sequentially through $\pi/4$-QPSK modulation and transform precoding. The transform precoding is pursuant to the definition of transform precoding in 3GPP TS38.211, section 6.3.1.4, or 3GPP TS 36.211, section 5.3.3.

In one embodiment, the K second-type complex numbers are obtained by bits in the first bit block sequentially through $\pi/4$-QPSK modulation, layer mapping and transform precoding. The transform precoding is pursuant to the definition of transform precoding in 3GPP TS38.211, section 6.3.1.4, or 3GPP TS 36.211, section 5.3.3.

In one embodiment, the K second-type complex numbers are obtained by bits in the first bit block sequentially through $\pi/4$-QPSK modulation, layer mapping, precoding and transform precoding. The transform precoding is pursuant to the definition of transform precoding in 3GPP TS38.211, section 6.3.1.4, or 3GPP TS 36.211, section 5.3.3. In one subembodiment, the precoding is Alamouti-based transmit diversity; in one subembodiment, the precoding is SC-SFBC; in one subembodiment, the precoding is SC-STBC.

In one embodiment, respective products of the K second-type complex numbers and the K first-type parameters are used for generating the K first-type complex numbers.

In one embodiment, respective products of the K second-type complex numbers and the K first-type parameters apply transform precoding to generate the K first-type complex numbers. In one subembodiment, the transform precoding is realized based on DFT; in one subembodiment, the transform precoding is pursuant to the definition of transform precoding in 3GPP TS38.211, section 6.3.1.4, or 3GPP TS 36.211, section 5.3.3.

In one embodiment, respective products of the K second-type complex numbers and the K first-type parameters sequentially apply transform precoding and precoding to generate the K first-type complex numbers. In one subembodiment, the transform precoding is realized based on DFT; in one subembodiment, the transform precoding is pursuant to the definition of transform precoding in 3GPP TS38.211, section 6.3.1.4, or 3GPP TS 36.211, section 5.3.3.

In one embodiment, respective products of the K second-type complex numbers and the K first-type parameters sequentially apply layer mapping, transform precoding and precoding to generate the K first-type complex numbers. In one subembodiment, the transform precoding is realized based on DFT; in one subembodiment, the transform precoding is pursuant to the definition of transform precoding in 3GPP TS38.211, section 6.3.1.4, or 3GPP TS 36.211, section 5.3.3.

In one embodiment, the K second-type complex numbers d (0), . . . , d (K−1) are obtained through the following formula:

$$d(k) = \frac{e^{jk\pi/2}}{\sqrt{2}}[(1-2b(k)) + j(1-2b(k))]$$

Herein, b(0), . . . , b(K−1) are bits in the first bit block.

In one embodiment, the K second-type complex numbers d (0), . . . , d (K−1) are obtained through the following formula:

$$c(k) = \frac{e^{jk\pi/2}}{\sqrt{2}}[(1-2b(k)) + j(1-2b(k))]$$

$$d(1 \cdot M_{sc} + k) = \frac{1}{\sqrt{M_{sc}}} \sum_{i=0}^{M_{sc}-1} c(1 \cdot M_{sc} + i)e^{-j\frac{2\pi ik}{M_{sc}}}$$

k=0, . . . , $M_{sc}$−1
l=0, . . . , K/$M_{sc}$−1

Herein, c(0), . . . , c(K−1) are output complex number symbols from modulation of the bits in the first bit block; $M_{sc}$ represents a number of subcarriers occupied by the first radio signal.

Embodiment 11

Figure 11:
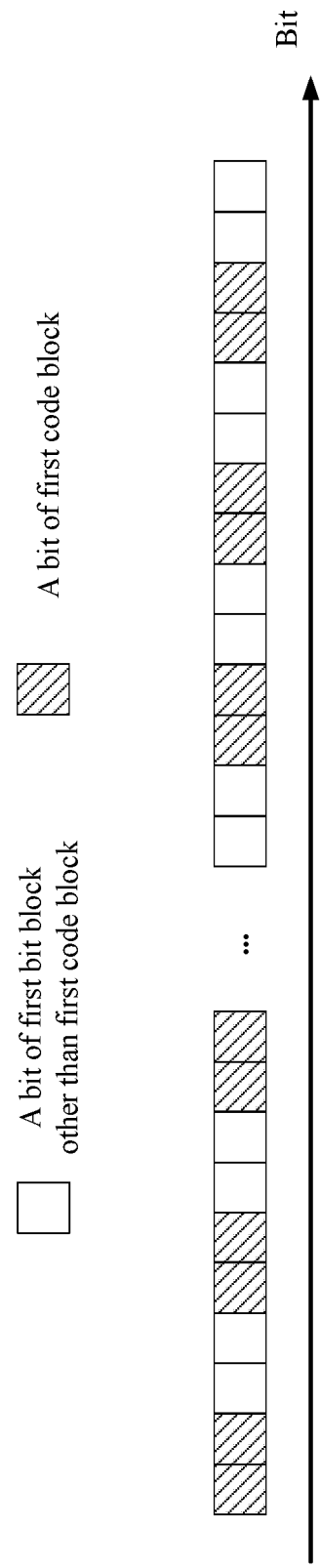
FIG. 11 illustrates a schematic diagram of a first code block according to one embodiment of the present disclosure.

Embodiment 11 illustrates a schematic diagram of a first code block according to one embodiment of the present disclosure, as shown in FIG. 11. In FIG. 11, the horizontal axis represents a direction in which bits of the first bit block are arranged; each small box represents a bit; a slash-filled box represents a bit in a first code block, while a blank box represents a bit of the first bit block other than the first code block.

In Embodiment 11, the first bit block in the present disclosure comprises M code blocks, M being an integer greater than 1; a first code block is one of the M code blocks, and there are two consecutive bits in the first code block that are discrete in the first bit block.

In one embodiment, any of the M code blocks (CBs) is obtained after segmentation of a transport block (TB).

In one embodiment, any of the M CBs comprises a positive integer number of bits.

In one embodiment, any two of the M CBs comprise equal numbers of bits.

In one embodiment, there are two of the M CBs that comprise unequal numbers of bits.

In one embodiment, there is one CB out of the M CBs that comprise a different number of bits from any other CBs.

In one embodiment, the first radio signal is transmitted via frequency hopping, and bits in the first CB are used for generating signals of the first radio signal in two or more frequency hopping frequency domain resources.

In one embodiment, the first radio signal is transmitted via frequency hopping, and bits in the first CB are used for generating first-type complex numbers out of the K first-type complex numbers which are mapped onto two different multicarrier symbols and different REs.

Embodiment 12

Figure 12:
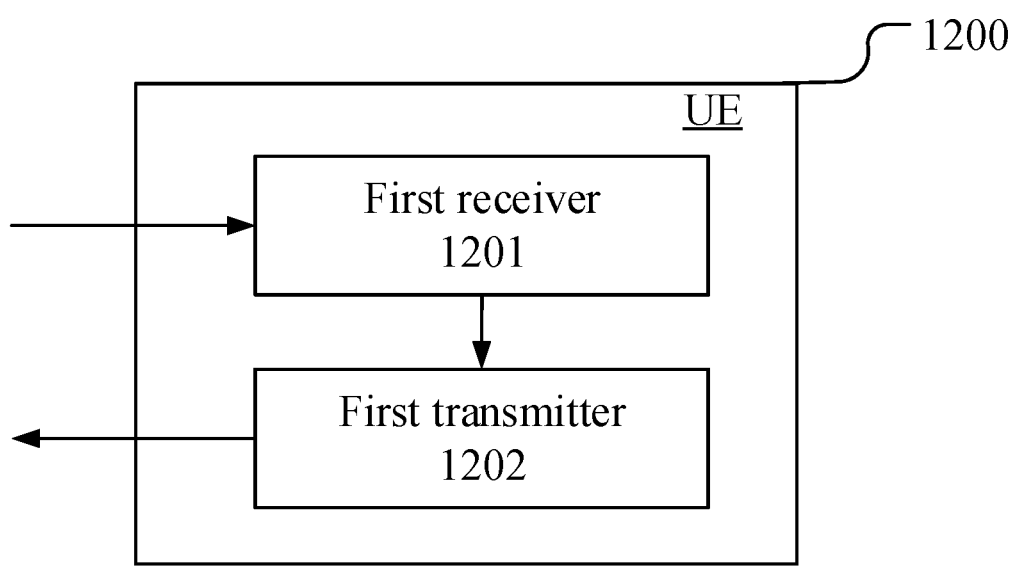
FIG. 12 illustrates a structure block diagram of a processing device in a UE according to one embodiment of the present disclosure.

Embodiment 12 illustrates a structure block diagram of a processing device in a UE, as shown in FIG. 12. In FIG. 12, a UE processing device 1200 comprises a first receiver 1201 and a first transmitter. The first receiver 1201 comprises the transmitter/receiver 456 (including the antenna 460), the receiving processor 452 and the controller/processor 490 in FIG. 4 of the present disclosure; the first transmitter 1202 comprises the transmitter/receiver 456 (including the antenna 460), the transmitting processor 455 and the controller/processor 490 in FIG. 4 of the present disclosure.

In Embodiment 12, the first receiver 1201 receives a first signaling; the first transmitter 1202 transmits a first radio signal; herein, the first signaling is used for determining K Resource Elements (REs), K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

In one embodiment, among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

In one embodiment, when the first RE occupies an earliest multicarrier symbol of multicarrier symbols occupied by the K REs in time domain, a first-type parameter corresponding to a first-type complex number mapped onto the first RE is equal to P, the P is a pre-defined complex number, or the P is a configurable complex number.

In one embodiment, there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

In one embodiment, the first bit block is used for generating K second-type complex numbers, respective products of the K second-type complex numbers and the K first-type parameters are used for generating the K first-type complex numbers.

In one embodiment, the first bit block comprises M code blocks (CBs), M being an integer greater than 1; a first CB is one of the M CBs, there are two consecutive bits in the first CB that are discrete in the first bit block.

In one embodiment, the first receiver 1201 also receives a second signaling; the second signaling is used for determining a length of a CP of each of the K REs.

Embodiment 13

Figure 13:
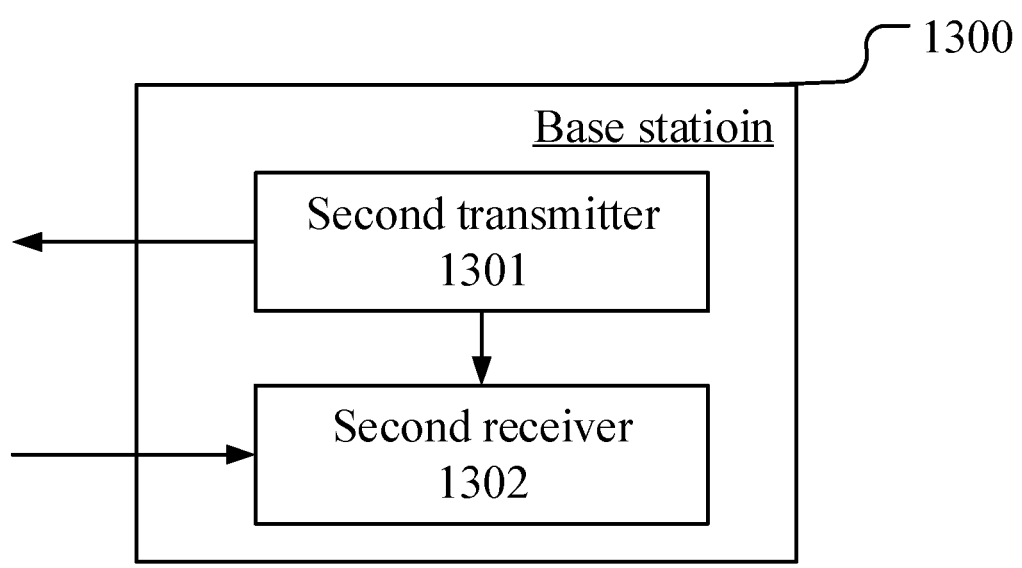
FIG. 13 illustrates a structure block diagram of a processing device in a base station according to one embodiment of the present disclosure.

Embodiment 13 illustrates a structure block diagram of a processing device in a base station, as shown in FIG. 13. In FIG. 13, a base station processing device 1300 comprises a second transmitter 1301 and a second receiver 1302. The second transmitter 1301 comprises the transmitter/receiver 416 (including the antenna 420), the transmitting processor 415 and the controller/processor 440 in FIG. 4 of the present disclosure; the second receiver 1302 comprises the transmitter/receiver 416 (including the antenna 420), the receiving processor 412 and the controller/processor 440.

In Embodiment 13, the second transmitter 1301 transmits a first signaling; the second receiver 1302 receives a first radio signal; herein, the first signaling is used for determining K REs, K first-type complex numbers are respectively mapped onto the K REs, the K first-type complex numbers are used for generating the first radio signal, K first-type parameters respectively correspond to the K first-type complex numbers, the K first-type parameters are respectively complex numbers each of which is of modulus equal to 1, the K first-type parameters are related to a frequency-domain position of the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain.

In one embodiment, the K REs are distributed on X multicarrier symbols in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by the target RE group are equal.

In one embodiment, among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

In one embodiment, there is a third RE besides the K REs, and there is a fourth RE among the K REs; the third RE and the fourth RE occupy a same subcarrier in frequency domain, and the third RE and the fourth RE respectively occupy two consecutive multicarrier symbols in time domain; a first-type parameter corresponding to a first-type complex number mapped onto the fourth RE is equal to a product of a virtual parameter and G, or a first-type parameter corresponding to a first-type complex number mapped onto the fourth RE is equal to H; the virtual parameter is related to a length of a cyclic prefix of the third RE, the G is a complex number of modulus equal to 1, an angle of the G in polar coordinates is related to a length of a cyclic prefix of the fourth RE, the H is a pre-defined complex number, or the H is a configurable complex number.

In one embodiment, the first bit block is used for generating K second-type complex numbers, respective products of the K second-type complex numbers and the K first-type parameters are used for generating the K first-type complex numbers.

In one embodiment, the first bit block comprises M CBs, M being an integer greater than 1; a first CB is one of the M CBs, there are two consecutive bits in the first CB that are discrete in the first bit block.

In one embodiment, the second transmitter 1301 also transmits a second signaling; the second signaling is used for determining a length of a CP of each of the K REs.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE or terminal in the present disclosure includes but is not limited to mobile phones, tablet computers, notebooks, network cards, low-consumption equipment, enhanced MTC (eMTC) equipment, NB-IOT equipment, vehicle-mounted communication equipment, etc. The base station or network side device in the present disclosure includes but is not limited to macro-cellular base stations, micro-cellular base stations, home base stations, relay base station, eNB, gNB, Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a first signaling; and
   transmitting a first radio signal;
   wherein the first signaling is used for determining K Resource Elements (REs), K first-type complex numbers are respectively mapped onto the K REs, the K first-type complex numbers are used for generating a baseband signal of the first radio signal through a baseband signal generation for generating an SC-FDMA baseband signal, a modulation scheme employed by the first radio signal is $\pi/2$-BPSK; K first-type parameters respectively correspond to the K first-type complex numbers, the K first-type parameters are respectively complex numbers each of which is of modulus equal to 1; the K REs occupy contiguous subcarriers in frequency domain, the K first-type parameters are related to a center frequency of the contiguous subcarriers occupied by the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain; any of the K first-type parameters is related to a time domain position of an RE out of the K REs onto which a corresponding first-type complex number is mapped; a time-domain position of one RE of the K REs among the K REs refers to an index of a multicarrier symbol occupied by the RE among multicarrier symbols occupied by the K REs; each of the K REs occupies a SC-FDMA subcarrier in frequency domain, and an SC-FDMA multicarrier symbol in time domain, an SC-FDMA multicarrier symbol comprising a CP.

2. The method according to claim 1, wherein the K REs are distributed on X multicarrier symbols in time domain, the X multicarrier symbols are consecutive in time domain, the X is a positive integer greater than 1; a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by REs comprised by the target RE group are equal.

3. The method according to claim 1, wherein among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

4. The method according to claim 3, wherein when the first RE occupies an earliest multicarrier symbol of multicarrier symbols occupied by the K REs in time domain, a first-type parameter corresponding to a first-type complex number mapped onto the first RE is equal to P, the P is equal to 1.

5. The method according to claim 1, wherein the first bit block is used for generating K second-type complex numbers, respective products of the K second-type complex numbers and the K first-type parameters are used for generating the K first-type complex numbers; the modulus of the K first-type complex numbers is related to a transmitting power of the first radio signal.

6. A method in a base station for wireless communication, comprising:
    transmitting a first signaling; and
    receiving a first radio signal;
    wherein the first signaling is used for determining K REs, K first-type complex numbers are respectively mapped onto the K REs, the K first-type complex numbers are used for generating a baseband signal of the first radio signal through a baseband signal generation for generating an SC-FDMA baseband signal, a modulation scheme employed by the first radio signal is $\pi/2$-BPSK; K first-type parameters respectively correspond to the K first-type complex numbers, the K first-type complex numbers are respectively complex numbers each of which is of modulus equal to 1; the K REs occupy contiguous subcarriers in frequency domain, the K first-type parameters are related to a center frequency of the contiguous subcarriers occupied by the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain; any of the K first-type parameters is related to a time domain position of an RE out of the K REs onto which a corresponding first-type complex number is mapped; a time-domain position of one RE of the K REs among the K REs refers to an index of a multicarrier symbol occupied by the RE among multicarrier symbols occupied by the K REs; each of the K REs occupies a SC-FDMA subcarrier in frequency domain, and an SC-FDMA multicarrier symbol in time domain, an SC-FDMA multicarrier symbol comprising a CP.

7. The method according to claim 6, wherein the K REs are distributed on X multicarrier symbols in time domain, the X multicarrier symbols are consecutive in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by REs comprised by the target RE group are equal.

8. The method according to claim 6, wherein among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

9. The method according to claim 8, wherein when the first RE occupies an earliest multicarrier symbol of multicarrier symbols occupied by the K REs in time domain, a first-type parameter corresponding to a first-type complex number mapped onto the first RE is equal to P, the P is equal to 1.

10. The method according to claim 6, wherein the first bit block is used for generating K second-type complex numbers, respective products of the K second-type complex numbers and the K first-type parameters are used for generating the K first-type complex numbers; the modulus of the K first-type complex numbers is related to a transmitting power of the first radio signal.

11. A UE for wireless communications, comprising:
a first receiver, receiving a first signaling; and
a first transmitter, transmitting a first radio signal;
wherein the first signaling is used for determining K Resource Elements(REs), K first-type complex numbers are respectively mapped onto the K REs, the K first-type complex numbers are used for generating a baseband signal of the first radio signal through a baseband signal generation for generating an SC-FDMA baseband signal, a modulation scheme employed by the first radio signal is $\pi/2$-BPSK; K first-type parameters respectively correspond to the K first-type complex numbers, the K first-type parameters are respectively complex numbers each of which is of modulus equal to 1; the K REs occupy contiguous subcarriers in frequency domain, the K first-type parameters are related to a center frequency of the contiguous subcarriers occupied by the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain; any of the K first-type parameters is related to a time domain position of an RE out of the K REs onto which a corresponding first-type complex number is mapped; a time-domain position of one RE of the K REs among the K REs refers to an index of a multicarrier symbol occupied by the RE among multicarrier symbols occupied by the K REs; each of the K REs occupies a SC-FDMA subcarrier in frequency domain, and an SC-FDMA multicarrier symbol in time domain, an SC-FDMA multicarrier symbol comprising a CP.

12. The UE according to claim 11, wherein the K REs are distributed on the X multicarrier symbols, the X multicarrier symbols are consecutive in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of first-type parameters corresponding to first-type complex numbers mapped onto REs comprised by REs comprised by the target RE group are equal.

13. The UE according to claim 11, wherein among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE or a frequency-domain position of REs out of the K REs that occupy a same multicarrier symbol as the second RE.

14. The UE according to claim 13, wherein when the first RE occupies an earliest multicarrier symbol of multicarrier symbols occupied by the K REs in time domain, a first-type parameter corresponding to a first-type complex number mapped onto the first RE is equal to P, the P is equal to 1.

15. The UE according to claim 11, wherein the first bit block is used for generating K second-type complex numbers, respective products of the K second-type complex numbers and the K first-type parameters are used for generating the K first-type complex numbers; the modulus of the K first-type complex numbers is related to a transmitting power of the first radio signal.

16. A base station for wireless communications, comprising:
a second transmitter, transmitting a first signaling; and
a second receiver, receiving a first radio signal;
wherein the first signaling is used for determining K Resource Elements(REs), K first-type complex numbers are respectively mapped onto the K REs, the K first-type complex numbers are used for generating a baseband signal of the first radio signal through a baseband signal generation for generating an SC-FDMA baseband signal, a modulation scheme employed by the first radio signal is $\pi/2$-BPSK; K first-type parameters respectively correspond to the K first-type complex numbers, the K first-type parameters are respectively complex numbers of which each is of modulus equal to 1; the K REs occupy contiguous subcarriers in frequency domain, the K first-type parameters are related to a center frequency of the contiguous subcarriers occupied by the K REs, each of the K first-type parameters is related to a length of a cyclic prefix of an RE onto which a corresponding first-type complex number is mapped; the first radio signal carries a first bit block, the K first-type parameters and the first bit block are used for generating the K first-type complex numbers, the K first-type parameters are unrelated to bits in the first bit block, the K REs are distributed on more than one subcarrier in frequency domain, and the K REs are distributed on more than one multicarrier symbol in time domain; any of the K first-type parameters is related to a time domain position of an RE out of the K REs onto which a corresponding first-type complex number is mapped; a time-domain position of one RE of the K REs among the K REs refers to an index of a multicarrier symbol occupied by the RE among multicarrier symbols occupied by the K REs; each of the K REs occupies a SC-FDMA subcarrier in frequency domain, and an SC-FDMA multicarrier symbol in time domain, an SC-FDMA multicarrier symbol comprising a CP.

17. The base station according to claim 16, wherein the K REs are distributed on X multicarrier symbols in time domain, the X multicarrier symbols are consecutive in time domain, the X is a positive integer greater than 1, a target multicarrier symbol is one of the X multicarrier symbols other than an earliest multicarrier symbol in time domain, REs occupying the target multicarrier symbol out of the K REs are comprised by a target RE group, any two of REs comprised by the target RE group are equal.

18. The base station according to claim 16, wherein among the K REs there are a first RE and a second RE, the first RE and the second RE occupy a same subcarrier in frequency domain, and the first RE and the second RE respectively occupy two consecutive multicarrier symbols in time domain; a first-type parameter corresponding to a first-type complex number mapped onto the second RE is equal to a product of Q and a first-type parameter corresponding to a first-type complex number mapped onto the first RE, the Q being a complex number of modulus equal to 1; an angle of the Q in polar coordinates is related to a length of a cyclic prefix of the second RE, and is also related to at least one of a frequency-domain position of the second RE in or a frequency-domain position of REs out of the K REs that occupy a same multicarrier symbol as the second RE.

19. The base station according to claim 18, wherein the first RE occupies an earliest multicarrier symbol of multi-carrier symbols occupied by the K REs in time domain, a first-type parameter corresponding to a first-type complex number mapped onto the first RE is equal to P, the P is equal to 1.

20. The base station according to claim 16, wherein the first bit block is used for generating K second-type complex numbers, respective products of the K second-type complex numbers and the K first-type parameters are used for generating the K first-type complex numbers; the modulus of the K first-type complex numbers is related to a transmitting power of the first radio signal.

* * * * *